United States Patent
An et al.

(10) Patent No.: US 12,377,679 B2
(45) Date of Patent: Aug. 5, 2025

(54) DRIVING WHEEL AND DRIVE UNIT INCLUDING THE SAME

(71) Applicants: HYUNDAI MOTOR COMPANY, Seoul (KR); KIA CORPORATION, Seoul (KR)

(72) Inventors: Jea Kyoo An, Seoul (KR); Hun Keon Ko, Anyang-si (KR); Hyun Kyoo Park, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 605 days.

(21) Appl. No.: 17/720,854

(22) Filed: Apr. 14, 2022

(65) Prior Publication Data

US 2023/0042031 A1    Feb. 9, 2023

(30) Foreign Application Priority Data

Aug. 4, 2021    (KR) .......................... 10-2021-0102741

(51) Int. Cl.
*B60B 9/26*    (2006.01)
*B60B 27/00*    (2006.01)

(52) U.S. Cl.
CPC ............ *B60B 9/26* (2013.01); *B60B 27/0015* (2013.01); *B60B 2200/20* (2013.01); *B60B 2900/313* (2013.01); *B60B 2900/551* (2013.01)

(58) Field of Classification Search
CPC .... B60B 9/24; B60B 9/26; B60B 9/28; B60B 27/0015; B60B 2200/20; B60B 15/10; B60B 15/12; B60B 15/18; B60B 15/22; B60B 19/00; B60B 19/04; B60B 19/26; B60B 2900/351; B60B 2900/313; B60B 2900/551; B60B 2900/1212; B60B 1/006; B60B 1/06; B60B 1/14; B60B 23/02; B60C 7/10; B60C 7/146; B61G 5/04
USPC ................................ 301/110.5, 12.1; 305/3
See application file for complete search history.

(56) References Cited

U.S. PATENT DOCUMENTS

| | | | |
|---|---|---|---|
| 2,610,898 A | * | 9/1952 | Smith .................. B60C 27/045 |
| | | | 301/47 |
| 7,503,567 B2 | | 3/2009 | Frankie |
| 2014/0251516 A1 | | 9/2014 | Burns |

(Continued)

FOREIGN PATENT DOCUMENTS

| | | | | |
|---|---|---|---|---|
| CN | 2461792 Y | * | 11/2001 | ............ B60B 19/00 |
| CN | 108349302 A | * | 7/2018 | ............ B60B 19/04 |
| CN | 110126544 A | * | 8/2019 | ............ B60L 50/00 |

(Continued)

*Primary Examiner* — S. Joseph Morano
*Assistant Examiner* — Eva L Comino
(74) *Attorney, Agent, or Firm* — Lempia Summerfield Katz LLC

(57) ABSTRACT

A driving wheel includes: a hub body disposed in a central region of the driving wheel; a plurality of spoke members inserted into the hub body and movable in a radial direction R of the driving wheel relative to the hub body; and link members each having one side coupled to one of the spoke members and the other side coupled to another spoke member disposed adjacent to the spoke member to which the one side of the link member is coupled. In particular, when the spoke members move in the radial direction R, the link members are rotatable about regions coupled to the spoke members.

14 Claims, 7 Drawing Sheets

(56) References Cited

U.S. PATENT DOCUMENTS

| | | | |
|---|---|---|---|
| 2019/0077191 A1 | | 3/2019 | Teixeira |
| 2020/0276863 A1 * | | 9/2020 | Wilson .................. B60B 31/02 |

FOREIGN PATENT DOCUMENTS

| | | | | |
|---|---|---|---|---|
| CN | 110843414 A | * | 2/2020 | ............. B60B 19/04 |
| CN | 110901298 A | * | 3/2020 | ............. B60B 19/00 |
| EP | 2509799 A1 | | 10/2012 | |
| JP | H05213001 A | | 8/1993 | |
| JP | 2002316501 A | | 10/2002 | |
| JP | 2005212675 A | | 8/2005 | |
| KR | 20060116602 A | | 11/2006 | |
| KR | 20160041117 A | | 4/2016 | |
| KR | 20180081667 A | | 7/2018 | |
| WO | WO-2021127661 A1 | * | 6/2021 | ............. A63B 55/60 |

* cited by examiner

DRIVING WHEEL AND DRIVE UNIT INCLUDING THE SAME

CROSS-REFERENCE TO RELATED APPLICATION

This application claims priority to and the benefit of Korean Patent Application No. 10-2021-0102741, filed on Aug. 4, 2021, the entire contents of which are incorporated herein by reference.

TECHNICAL FIELD

The present disclosure relates to a driving wheel and a drive unit including the same, and more particularly, to a driving wheel capable of being used for a mobility vehicle such as a wheelchair, and to a drive unit including the same.

BACKGROUND ART

The statements in this section merely provide background information related to the present disclosure and may not constitute prior art.

A wheel provided in a mobility vehicle such as a wheelchair needs to be structured to minimize impact applied to the mobility vehicle and an occupant due to irregularity of a road surface on which the mobility vehicle travels.

To this end, in the related art, an attempt has been made to reduce impact applied to a mobility vehicle and an occupant by applying a wheel having a structure that changes a shape of the wheel depending on a state of the road surface.

However, we have discovered that a wheel in the related art, which is designed focusing on a reduction in an impact applied to a mobility vehicle and an occupant, significantly degrades traveling performance and traveling efficiency. On the contrary, a wheel, which is designed focusing on traveling performance and traveling efficiency of a mobility vehicle, cannot sufficiently reduce such an impact.

SUMMARY

The present disclosure has been made in an effort to provide a driving wheel having a structure capable of minimizing an impact applied to a mobility vehicle and an occupant while improving traveling performance and traveling efficiency of the mobility vehicle.

In an exemplary embodiment of the present disclosure, a driving wheel includes: a hub body disposed in a central region of the wheel and having a plurality of first through-holes formed in a circumferential direction C; a plurality of spoke members movable in a radial direction R of the wheel relative to the hub body, disposed in the circumferential direction C, and inserted into the first through-holes formed in the hub body; and a plurality of link members disposed in the circumferential direction C and each having one side coupled to one of the spoke member and the other side coupled to another spoke member disposed adjacent to the spoke member to which one side of the link member is coupled, in which when the spoke members move in the radial direction R, the link members are rotatable about regions coupled to the spoke members.

When one of the plurality of spoke members moves in one direction of the radial direction R, a restriction relationship between the hub body, the spoke members, and the link members may allow another adjacent spoke member to move in the other direction opposite to one direction of the radial direction R.

One side of each of the two adjacent link members may be coupled to one region of the spoke member disposed between the two link members.

The spoke member may include: a rod portion extending in the radial direction R; and protruding portions extending from one side of the rod portion in a width direction W of the driving wheel, the link member may have second through-holes, and the protruding portions may be inserted and coupled into the second through-holes.

The protruding portions may include: a first protruding portion extending from the rod portion in one direction of the width direction W; and a second protruding portion extending from the rod portion in a direction opposite to one direction of the width direction W, and the first protruding portion and the second protruding portion may face each other with the rod portion interposed therebetween.

The first protruding portion may be inserted and coupled into the second through-hole of one of the two link members coupled to the spoke member, and the second protruding portion may be inserted and coupled into the second through-hole of the other of the two link members coupled to the spoke member.

The second through-hole may have a width defined in a width direction of the link member and corresponding to a cross-section of the protruding portion, and a width defined in a longitudinal direction of the link member and larger than the cross-section of the protruding portion.

The second through-holes may be respectively disposed at two opposite ends in the longitudinal direction of the link member.

The hub body may include: an extension portion extending from a central region of the hub body in the radial direction R; and coupling portions protruding from the extension portion in the width direction W, the link member may have a third through-hole, and the coupling portion may be inserted and coupled into the third through-hole.

The third through-hole may be formed in a central region in the longitudinal direction of the link member.

The third through-hole may have a size and shape corresponding to an outer diameter of the coupling portion.

The hub body may include: an inner portion disposed in the central region of the hub body, having a cylindrical outer circumferential surface, and connected to one side of the extension portion; and an outer portion disposed in a circumferential region of the hub body, having a cylindrical outer circumferential surface, and connected to the other side of the extension portion.

The first through-hole may include: a plurality of first-1 through-holes formed along the circumferential surface of the inner portion; and a plurality of first-2 through-holes formed along the circumferential surface of the outer portion, and the spoke members may be inserted into the first-1 through-holes and the first-2 through-holes.

The plurality of spoke members may be compatibly equal to one another, and the plurality of link members may be compatibly equal to one another.

The plurality of spoke members may be disposed at an equal interval in the circumferential direction C.

Another exemplary embodiment of the present disclosure provides a drive unit including: a driving wheel; and a brake part configured to allow or restrict a motion of the driving wheel in a radial direction, in which the driving wheel includes: a hub body disposed in a central region of the wheel and having a plurality of first through-holes formed in a circumferential direction C; a plurality of spoke members movable in a radial direction R of the wheel relative to the hub body, disposed in the circumferential direction C, and inserted into the first through-holes formed in the hub body; and a plurality of link members disposed in the circumferential direction C and each having one side coupled to one of the spoke member and the other side coupled to another spoke member disposed adjacent to the spoke member to which one side of the link member is coupled, in which when the spoke members move in the radial direction R, the link members are rotatable about regions coupled to the spoke members.

The brake part may include: a brake body disposed inside or outside the hub body and configured to allow the spoke member to be inserted thereinto; a lever member coupled to one side of the brake body and rotatable relative to the brake body; a wire fixed to one side of the lever member; and a tension generating motor coupled to the other side of the wire and configured to adjust tension of the wire.

The hub body may include: an extension portion extending from a central region of the hub body in the radial direction R; an inner portion disposed in the central region of the hub body, having a cylindrical outer circumferential surface, and connected to one side of the extension portion; and an outer portion disposed in a circumferential region of the hub body, having a cylindrical outer circumferential surface, and connected to the other side of the extension portion, and the inner portion may have an inner wire hole penetrated by the wire, and the outer portion may have an outer wire hole penetrated by the wire.

The brake body may be coupled to an outer surface of the outer portion.

According to the present disclosure, it is possible to provide the driving wheel having the structure capable of minimizing an impact applied to the mobility vehicle and the occupant while improving traveling performance and traveling efficiency of the mobility vehicle.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Hereinafter, a driving wheel and a drive unit according to the present disclosure are described with reference to the drawings. Meanwhile, the driving wheel and the drive unit according to the present disclosure may be applied to a mobility vehicle such as a wheelchair.

Driving Wheel

Figure 1:
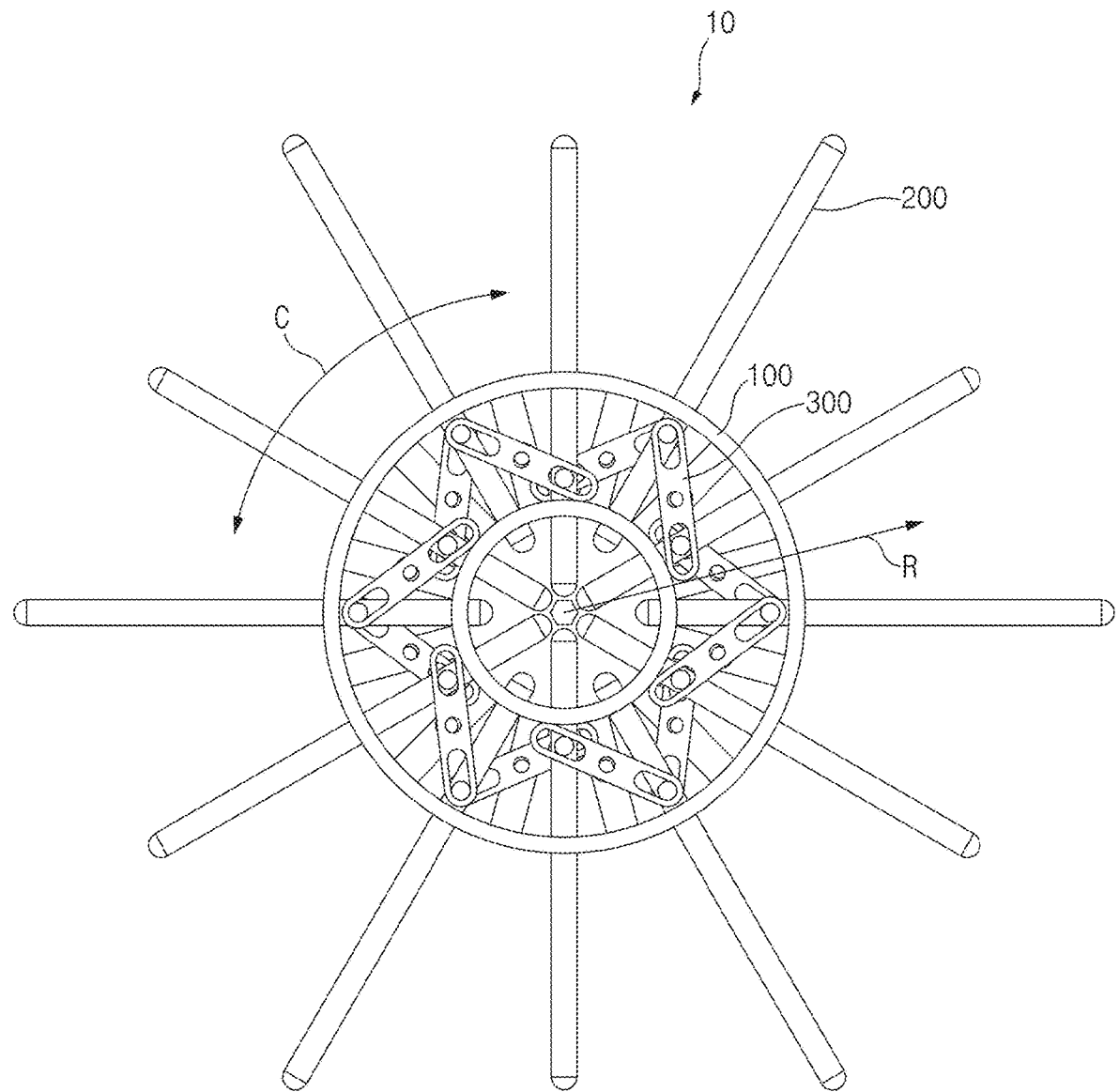
FIG. 1 is a side view illustrating a structure of a driving wheel according to one form of the present disclosure.
Figure 2:
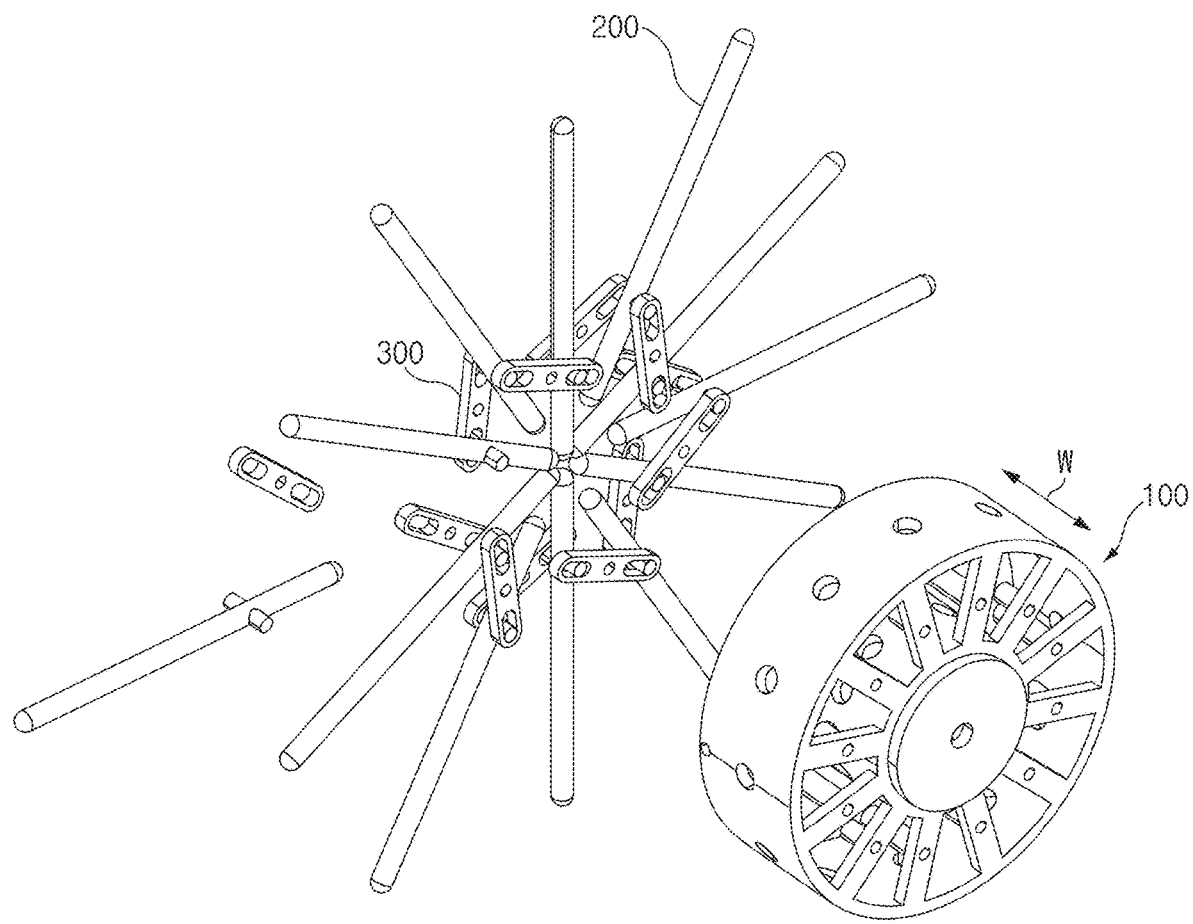
FIG. 2 is an exploded perspective view illustrating disassembled components of the driving wheel according to the present disclosure.
Figure 3:
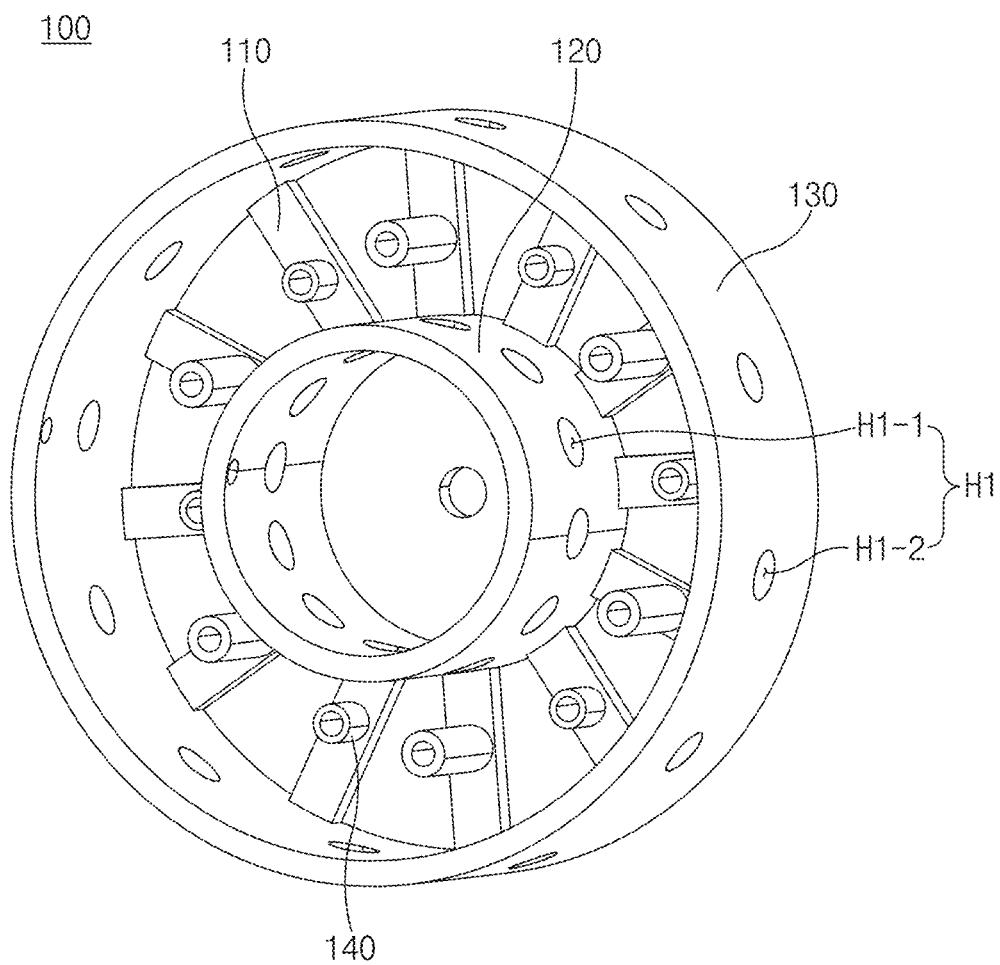
FIG. 3 is a perspective view illustrating a structure of a hub body of the driving wheel according to the present disclosure.
Figure 4:
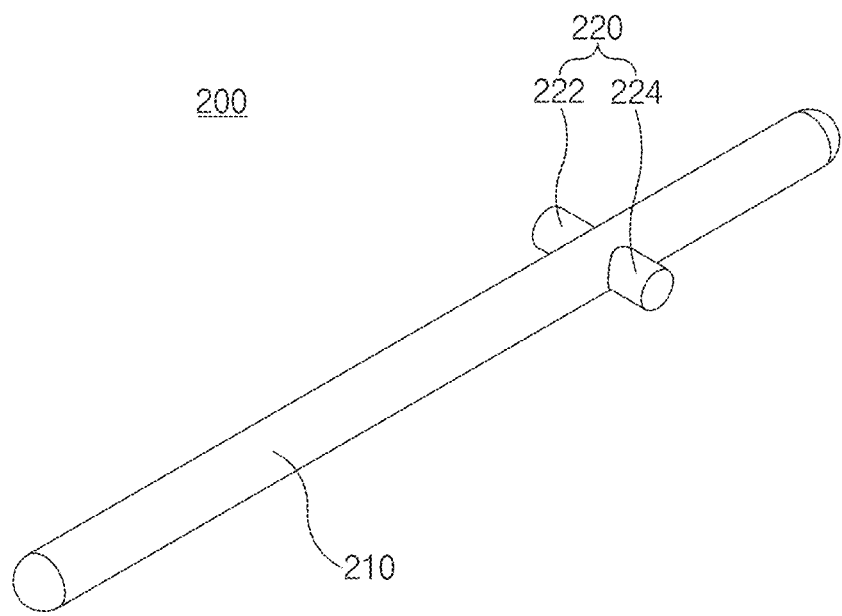
FIG. 4 is a perspective view illustrating a structure of a spoke member of the driving wheel according to another form of the present disclosure.
Figure 5:
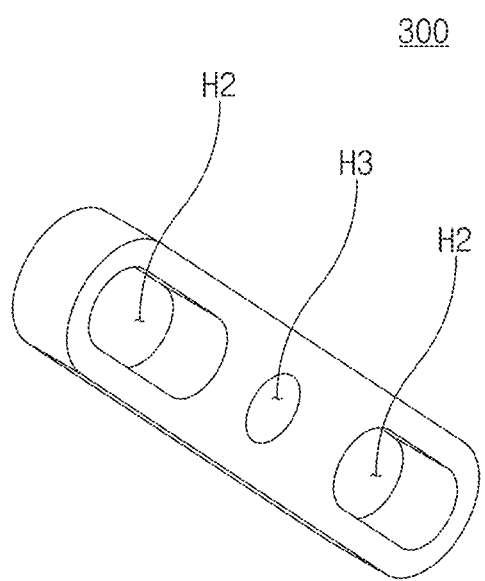
FIG. 5 is a perspective view illustrating a structure of a link member of the driving wheel according to one form of the present disclosure.

FIG. 1 is a side view illustrating a structure of a driving wheel according to one form of the present disclosure, and FIG. 2 is an exploded perspective view illustrating disassembled components of the driving wheel according to the present disclosure. FIG. 3 is a perspective view illustrating a structure of a hub body of the driving wheel according to one form of the present disclosure, and FIG. 4 is a perspective view illustrating a structure of a spoke member of the driving wheel according to one form of the present disclosure. FIG. 5 is a perspective view illustrating a structure of a link member of the driving wheel according to another form of the present disclosure.

Referring to FIGS. 1 to 5, a driving wheel 10 may include: a hub body 100 disposed in a central region in a radial direction R of the wheel and having a plurality of first through-holes H1 disposed in a circumferential direction C of the wheel; and a plurality of spoke members 200 disposed in the circumferential direction C and respectively inserted into the first through-holes H1 formed in the hub body 100. In particular, the plurality of spoke members 200 are movable in the radial direction R of the wheel relative to the hub body 100. More particularly, the plurality of spoke members 200 may be disposed at an equal interval in the circumferential direction C. The first through-holes H1 may also correspond in number to the number of spoke members 200 and be disposed at an equal interval in the circumferential direction C. The drawings in the present disclosure each illustrate an example in which twelve spoke members 200 are disposed at an equal interval, but the number of spoke members 200 is not limited to that illustrated in the drawings. More particularly, an even number of spoke members 200 may be disposed.

In addition, the driving wheel 10 may further include a plurality of link members 300 disposed in the circumferential direction C. One side of the link member 300 is coupled to one of the spoke members 200, and the other side of the link member 300 is coupled to another spoke member 200 disposed adjacent to the spoke member 200 to which one side of the link member 300 is coupled. In more detail, the link member 300 is configured to connect the two spoke members 200 disposed adjacent to each other in the circumferential direction C. Therefore, the link members 300 may also be equal in number to the number of spoke members 200. The drawings in the present disclosure each illustrate an example in which twelve link members 300 are disposed at an equal interval, but the number of link members 300 is not limited to that illustrated in the drawings. More particularly, an even number of link members 300 may be disposed.

According to the present disclosure, when the spoke members 200 move in the radial direction R, the link members 300 may rotate about the regions coupled to the spoke members 200.

In more detail, two random spoke members 200, which are disposed adjacent to each other in the circumferential direction C, may be connected to each other by means of the link member 300 disposed between the two spoke members 200, and the link member 300 may be rotatably coupled to the two spoke members 200. Therefore, according to the present disclosure, when one of the plurality of spoke members 200 moves in one direction of the radial direction R, a restriction relationship between the hub body 100, the spoke members 200, and the link members 300 may allow another adjacent spoke member 200 to move in the other direction opposite to the one direction of the radial direction R. For example, when one of the plurality of spoke members 200 provided in the driving wheel 10 moves inward in the radial direction R (i.e., moving toward the center of the driving wheel 10), the two spoke members 200, which are disposed adjacent to the above-mentioned spoke member 200, may move outward in the radial direction R. In another form, when one of the plurality of spoke members 200 provided in the driving wheel moves outward in the radial direction R, the two spoke members 200, which are disposed adjacent to the above-mentioned spoke member 200, may move inward in the radial direction R.

In more detail, when the initial spoke member 200, which is moved in the radial direction R by directly receiving an external force among the plurality of spoke members 200, is defined as a first spoke member, and the spoke members, which are disposed clockwise in the circumferential direction C based on the first spoke member, are defined as the second spoke member, the third spoke member, . . . , and the 2n-th spoke member, respectively, the first, third, fifth, . . . , and (2n−1)-th spoke members may move in the direction opposite to the direction in which the second, fourth, sixth, . . . , and 2n-th spoke members move.

In another form of the present disclosure, referring to FIG. 3, the hub body 100 may include: an extension portion 110 extending in the radial direction R from a central region of the hub body 100, an inner portion 120 which is disposed in the central region of the hub body 100, having a cylindrical outer circumferential surface, and connected to one side of the extension portion 110, an outer portion 130 disposed in a circumferential region of the hub body 100, having a cylindrical outer circumferential surface, and connected to the other side of the extension portion 110, and coupling portions 140 protruding from the extension portion 110 in a width direction W of the driving wheel. For example, as illustrated in FIG. 3, the extension portion 110 may be provided in plural numbers, and the plurality of extension portions 110 may be disposed in the circumferential direction C. However, the extension portion 110 may be configured as a single body. More particularly, the inner portion 120 and the outer portion 130 may be respectively connected to one end and the other end of the extension portion 110.

In one form, referring to FIG. 4, the spoke member 200 may include a rod portion 210 extending in the radial direction R, and protruding portions 220 extending from sides of the rod portion 210 in the width direction W (see FIG. 3). In more detail, the protruding portions 220 may include a first protruding portion 222 extending from the rod portion 210 in one direction of the width direction W, and a second protruding portion 224 extending from the rod portion 210 in a direction opposite to the one direction of the width direction W. Therefore, the first protruding portion 222 and the second protruding portion 224 may face away from each other with respect to the rod portion 210 which is interposed between the first protruding portion 222 and the second protruding portion 224.

In another form, referring to FIG. 5, the link member 300 may have second through-holes H2, and the protruding portions 220 may be inserted into the second through-holes H2. In more detail, referring to FIG. 1, the two link members 300 may be coupled to each of the spoke members 200. The first protruding portion 222 may be inserted and coupled into the second through-hole H2 of one of the two link members 300 coupled to the spoke member 200, and the second protruding portion 224 may be inserted and coupled into the second through-hole H2 of the other of the two link members 300 coupled to the spoke member 200.

Therefore, as illustrated in FIG. 2, the two link members 300 coupled to any one of the spoke members 200 may face each other with the spoke member 200 interposed therebetween in the regions coupled to the spoke member 200. It may be understood that one side of each of the two adjacent link members 300 is coupled to each of the regions of the spoke member 200, disposed between the two link members 300, where the first protruding portion 222 and the second protruding portion 224 are formed.

Referring to FIG. 5, the second through-hole H2 formed in the link member 300 may be an elongate slot that extends in the longitudinal direction of the link member 300, having a width corresponding to and compatible with a cross-section of the protruding portion 220 and a length greater than a cross-section of the protruding portion 220 such that the spoke member 200 can move in the radial direction R within a predetermined range. The width of the second through-hole H2 is defined in the width direction of the link member 300 and the length is defined in the longitudinal direction of the link member 300. Because the second through-hole H2 has the length greater than the cross-section of the protruding portion, the spoke member 200 moves in the radial direction R within the predetermined range. That is, according to the present disclosure, a range in which the spoke member 200 may move in the radial direction R may be defined within a range in which the protruding portion 220 moves in the second through-hole H2. In addition, because the second through-hole H2 has the width corresponding to the cross-section of the protruding portion, the second through-hole H2 guides the movement of the spoke member 200 in the radial direction R and thereby restricts the movement of the spoke member 200 in another direction other than the radial direction R. Meanwhile, a direction in which the link member 300 extends toward the two spoke members 200 coupled to the link member 300 is defined as the longitudinal direction of the link member 300, and a direction perpendicular to the longitudinal direction of the link member 300, i.e., the width direction W of the driving wheel 10 is defined as the width direction of the link member 300.

Meanwhile, as described above, the link members 300 may be respectively coupled to the two spoke members 200 disposed adjacent to each other in the circumferential direction C. To this end, the second through-holes H2 formed in the link member 300 may be respectively disposed at two opposite ends in the longitudinal direction of the link member 300.

Referring to FIG. 5, the link member 300 may have a third through-hole H3. In this case, as illustrated in FIGS. 1, 3, and 5, the coupling portion 140 provided on the hub body 100 may be inserted and coupled into the third through-hole H3. More particularly, the third through-hole H3 may be formed in a central region in the longitudinal direction of the link member 300. The third through-hole H3 may have a size and shape corresponding to an outer diameter of the coupling portion 140. Therefore, according to the present disclosure, when the spoke member 200 moves in the radial direction R, the link member 300 may rotate about the coupling portion 140 as a rotation axis. In more detail, the link member 300 including the second through-holes and the third through-hole may have a symmetric shape in the longitudinal direction and the width direction of the link member 300.

Meanwhile, referring to FIG. 3, the first through-holes H1 formed in the hub body 100 may include a plurality of first-1 through-holes H1-1 formed along the circumferential surface of the inner portion 120, and a plurality of first-2 through-holes H1-2 formed along the circumferential surface of the outer portion 130. In this case, the spoke members 200 may be respectively inserted into the first-1 through-holes H1-1 and the first-2 through-holes H1-2. To allow the spoke members 200 to be disposed in a direction parallel to the radial direction R, the directions in which the first-1 through-holes H1-1 and the first-2 through-holes H1-2, into which the spoke members 200 are respectively inserted, are disposed may also be parallel to the radial direction R.

Meanwhile, the driving wheel 10 according to the present disclosure may have a symmetric shape with respect to any axis extending in the radial direction R. To this end, the plurality of spoke members 200 provided in the driving wheel 10 may be compatibly equal to one another, and the plurality of link members 300 may be compatibly equal to one another.

Figure 6:
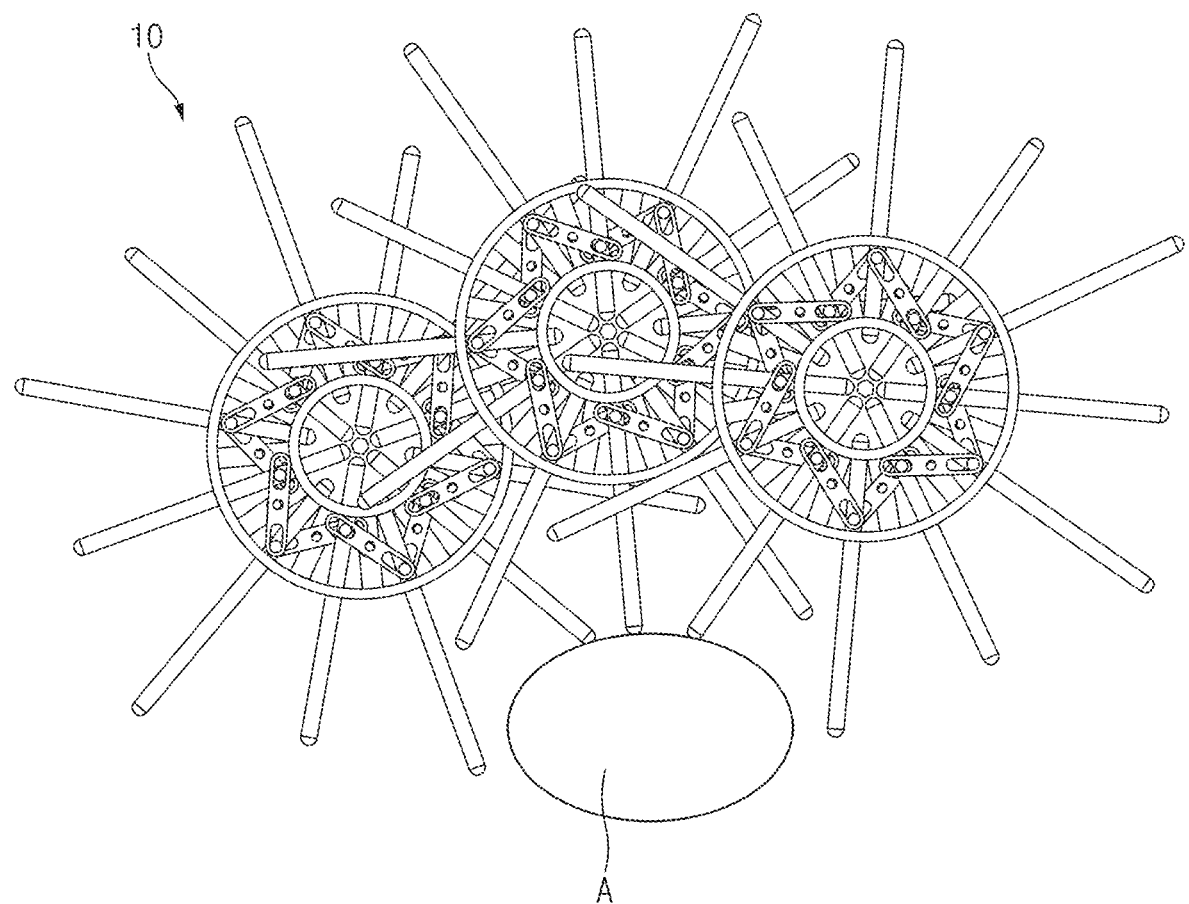
FIG. 6 is a view illustrating a state in which the driving wheel according to the present disclosure passes over an obstacle on a road surface.

FIG. 6 is a view illustrating a state in which the driving wheel according to the present disclosure passes over an obstacle on a road surface.

A method of operating the driving wheel 10 according to the present disclosure is described below with reference to the above-mentioned contents and FIGS. 1 to 6.

When the driving wheel 10 encounters an obstacle A protruding upward from a road surface while traveling on the road surface, the spoke member 200, which will come into contact with the obstacle A among the plurality of spoke members 200, may be controlled to slide so as to protrude outward in the radial direction R. In this case, a relative speed between the obstacle A and the spoke member 200, which will come into contact with the obstacle A, increases in comparison with a case in which the spoke member 200 does not slide. Therefore, it is possible to more quickly cope with the obstacle A.

Drive Unit

Figure 7:
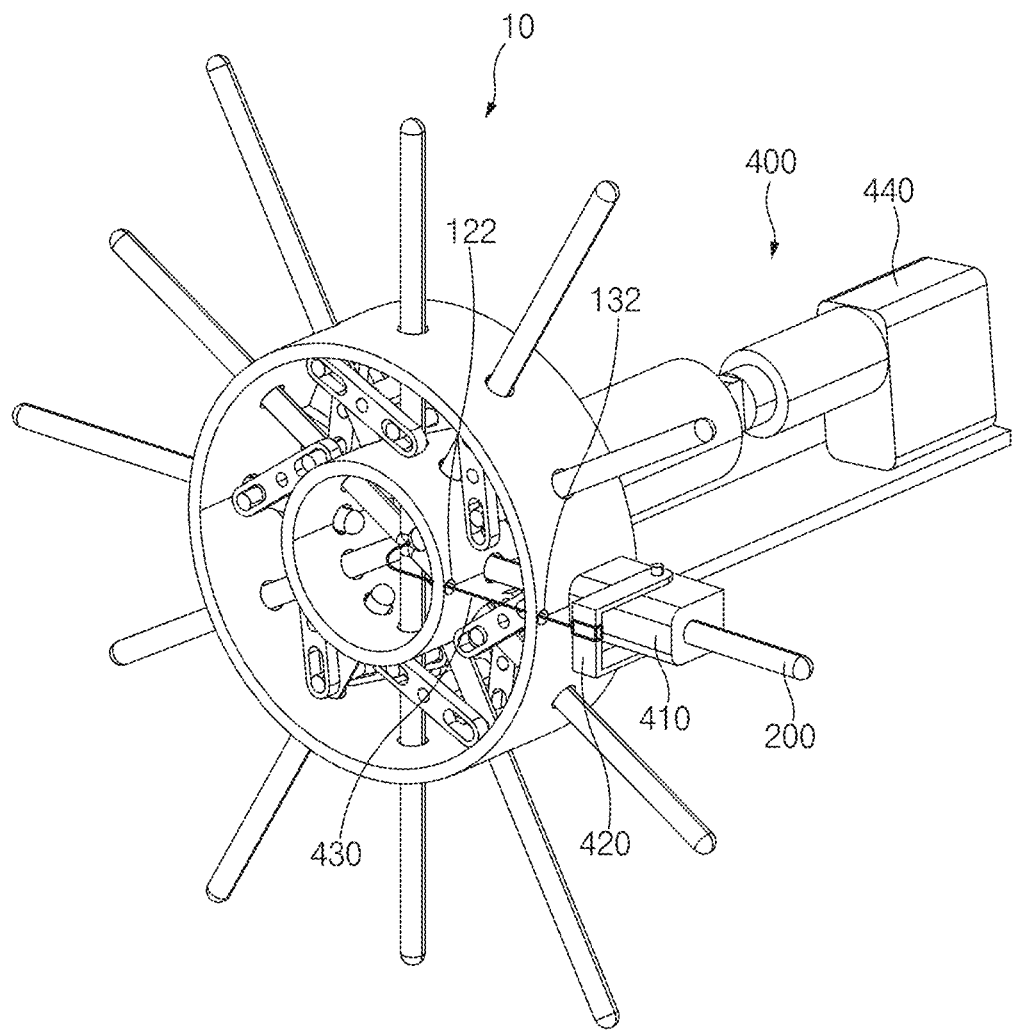
FIG. 7 is a perspective view illustrating a structure of a drive unit according to another form of the present disclosure.

FIG. 7 is a perspective view illustrating a structure of a drive unit according to the present disclosure.

A drive unit 20 according to the present disclosure may include the driving wheel 10, and a brake part 400 configured to selectively allow or restrict the motion of the driving wheel 10 in the radial direction R.

The driving wheel 10 may include: the hub body 100 disposed in the central region of the wheel and having the plurality of first through-holes H1 formed in the circumferential direction C; the plurality of spoke members 200 movable in the radial direction R of the wheel relative to the hub body 100, disposed in the circumferential direction C, and inserted into the first through-holes H1 formed in the hub body 100; and the plurality of link members 300 disposed in the circumferential direction C and each having one side coupled to one of the spoke members 200 and the other side coupled to another spoke member 200 disposed adjacent to the spoke member 200 to which one side of the link member 300 is coupled. In this case, according to the present disclosure, when the spoke members 200 move in the radial direction R, the link members 300 may rotate about the regions coupled to the spoke members 200. Meanwhile, the description of the driving wheel 10 provided in the drive unit 20 according to the present disclosure may be replaced with the above-mentioned description of the driving wheel 10 according to the present disclosure.

The brake part 400 provided in the drive unit 20 according to the present disclosure may be coupled to some of the plurality of spoke members 200 and configured to selectively restrict or allow the sliding motions of some of the spoke members 200 in the radial direction R. For example, the brake part 400 may restrict or allow the motion of the spoke member 200 in the radial direction R by generating a frictional force with the spoke member 200.

In more detail, as illustrated in FIG. 7, the brake part 400 may include: a brake body 410 disposed inside or outside the hub body 100 and configured to allow the spoke member 200 to be inserted thereinto; a lever member 420 coupled to one side of the brake body 410 and rotatable relative to the brake body 410; a wire 430 fixed to one side of the lever member 420; and a tension generating motor 440 coupled to the other side of the wire 430 and configured to adjust tension of the wire 430.

According to the present disclosure, when the tension generating motor 440 pulls the lever member 420 by pulling the wire 430, the lever member 420 rotates relative to the brake body 410, and a braking means (not illustrated), which is disposed in the brake body 410 and operates in conjunction with the motion of the lever member 420, presses the spoke member 200, which makes it possible to restrict the motion of the spoke member 200 in the radial direction R. On the contrary, when the tension generating motor 440 does not pull the wire 430, the lever member 420 is restored to an original state, and the braking means is also restored in an original state in a direction in which the spoke member 200 is not pressed. Therefore, the spoke member 200 may move in the radial direction R. That is, according to the present disclosure, the brake part 400 may operate to restrict the motion of the spoke member 200 when the spoke member 200 does not slide and the shape of the driving wheel 10 needs to be maintained even though an external force is applied to the driving wheel 10.

Meanwhile, as illustrated in FIG. 3, the hub body 100 may include the extension portion 110 extending in the radial direction R from the central region of the hub body 100, the inner portion 120 disposed in the central region of the hub body 100, having a cylindrical outer circumferential surface, and connected to one side of the extension portion 110, and the outer portion 130 disposed in the circumferential region of the hub body 100, having a cylindrical outer circumferential surface, and connected to the other side of the extension portion 110.

In this case, as illustrated in FIG. 7, the inner portion 120 (see FIG. 3) may have an inner wire hole 122 penetrated by the wire 430, and the outer portion 130 (see FIG. 3) may have an outer wire hole 132 penetrated by the wire 430.

Meanwhile, as illustrated in FIG. 7, the brake body 410 may be connected to the outer surface of the outer portion 130 (see FIG. 3), for example. However, the position of the brake body 410 is not limited to that illustrated in the drawings.

The present disclosure has been described with reference to the limited embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

What is claimed is:

1. A driving wheel comprising:
a hub body disposed in a central region of the driving wheel and having a plurality of first through-holes formed in a circumferential direction of the driving wheel;
a plurality of spoke members movable in a radial direction of the driving wheel relative to the hub body, disposed in the circumferential direction, and inserted into the plurality of first through-holes formed in the hub body; and
a plurality of link members disposed in the circumferential direction and each having one side coupled to one of the plurality of spoke members and other side coupled to another spoke member disposed adjacent to the spoke member to which the one side of the link member is coupled,
wherein when the plurality of spoke members move in the radial direction, the plurality of link members are rotatable about regions coupled to the plurality of spoke members,
wherein one side of each of two adjacent link members among the plurality of link members is coupled to one region of a spoke member disposed between the two adjacent link members,
wherein the plurality of spoke members each comprises:
a rod portion extending in the radial direction; and
protruding portions extending from one side of the rod portion in a width direction of the driving wheel,
wherein the plurality of link members has second through-holes, and the protruding portions are inserted into the second through-holes,
wherein the hub body comprises:
an extension portion extending from a central region of the hub body in the radial direction; and
coupling portions protruding from the extension portion in the width direction, and
wherein the link member has a third through-hole, and the coupling portion is inserted and coupled into the third through-hole.

2. The driving wheel of claim 1, wherein when one of the plurality of spoke members moves in a first direction of the radial direction, a restriction relationship between the hub body, the plurality of spoke members, and the plurality of link members allows another adjacent spoke member, among the plurality of spoke members, to move in a second direction opposite to the first direction of the radial direction.

3. The driving wheel of claim 1, wherein the plurality of spoke members are equal to each other, and the plurality of link members are equal to each other.

4. The driving wheel of claim 1, wherein the plurality of spoke members is disposed at an equal interval in the circumferential direction.

5. The driving wheel of claim 1, wherein the protruding portions comprise:
a first protruding portion extending from the rod portion in a first direction of the width direction; and
a second protruding portion extending from the rod portion in a second direction opposite to the first direction of the width direction, and
wherein the first protruding portion and the second protruding portion face away from each other with respect to the rod portion interposed therebetween.

6. The driving wheel of claim 5, wherein the first protruding portion is inserted and coupled into the second through-hole of one of the two adjacent link members coupled to the spoke member, and the second protruding portion is inserted and coupled into the second through-hole of the other of the two adjacent link members coupled to the spoke member.

7. The driving wheel of claim 1, wherein the second through-hole has a width defined in a width direction of the link member and corresponding to a cross-section of the protruding portion, and a width defined in a longitudinal direction of the link member and larger than a cross-section of the protruding portion.

8. The driving wheel of claim 7, wherein the second through-holes are respectively disposed at two opposite ends in the longitudinal direction of the link member.

9. The driving wheel of claim 1, wherein the third through-hole is formed in a central region in a longitudinal direction of the link member.

10. The driving wheel of claim 9, wherein the third through-hole has a size and shape corresponding to an outer diameter of the coupling portion.

11. The driving wheel of claim 1, wherein the hub body comprises:
an inner portion disposed in the central region of the hub body, having a cylindrical outer circumferential surface, and connected to one side of the extension portion; and
an outer portion disposed in a circumferential region of the hub body, having a cylindrical outer circumferential surface, and connected to other side of the extension portion.

12. The driving wheel of claim 11, wherein the first through-hole comprises:
a plurality of first-1 through-holes formed along the cylindrical outer circumferential surface of the inner portion; and
a plurality of first-2 through-holes formed along the cylindrical outer circumferential surface of the outer portion, and
wherein the plurality of spoke members are inserted into the first-1 through-holes and the first-2 through-holes.

13. A drive unit comprising:
a driving wheel; and
a brake part configured to allow or restrict a motion of the driving wheel in a radial direction of the driving wheel,
wherein the driving wheel comprises:
a hub body disposed in a central region of the driving wheel and having a plurality of first through-holes formed in a circumferential direction of the driving wheel;
a plurality of spoke members movable in a radial direction of the driving wheel relative to the hub body, disposed in the circumferential direction, and inserted into the plurality of first through-holes formed in the hub body; and
a plurality of link members disposed in the circumferential direction and each having one side coupled to one of the plurality of spoke members and other side coupled to another spoke member, among the plurality of spoke members, disposed adjacent to the spoke member to which the one side of the link member is coupled,
wherein when the plurality of spoke members move in the radial direction, the plurality of link members are rotatable about regions coupled to the plurality of spoke members,
wherein the brake part comprises:
a brake body disposed inside or outside the hub body and configured to allow a spoke member, among the plurality of spoke members, to be inserted thereinto;

a lever member coupled to one side of the brake body and rotatable relative to the brake body;

a wire fixed to one side of the lever member; and a tension generating motor coupled to other side of the wire and configured to adjust tension of the wire, wherein the hub body comprises:

an extension portion extending from a central region of the hub body in the radial direction;

an inner portion disposed in the central region of the hub body, having a cylindrical outer circumferential surface, and connected to one side of the extension portion; and an outer portion disposed in a circumferential region of the hub body, having a cylindrical outer circumferential surface, and connected to other side of the extension portion, and wherein the inner portion has an inner wire hole penetrated by the wire, and the outer portion has an outer wire hole penetrated by the wire.

14. The drive unit of claim 13, wherein the brake body is coupled to an outer surface of the outer portion.

\* \* \* \* \*